United States Patent [19]

Leung et al.

[11] Patent Number: 5,455,208
[45] Date of Patent: * Oct. 3, 1995

[54] CARBON-CONTAINING BLACK GLASS MONOLITHS

[75] Inventors: Roger Y. Leung, Schaumburg; Stephen T. Gonczy, Mount Prospect; Ming S. Shum, Des Plaines; Joseph J. Zupancic, Bensenville, all of Ill.

[73] Assignee: AlliedSignal Inc., Morris Township, Morris County, N.J.

[*] Notice: The portion of the term of this patent subsequent to Sep. 7, 2010 has been disclaimed.

[21] Appl. No.: 196,054

[22] Filed: Feb. 14, 1994

Related U.S. Application Data

[60] Division of Ser. No. 816,269, Dec. 23, 1991, Pat. No. 5,328,976, which is a continuation-in-part of Ser. No. 2,049, Jan. 9, 1987, Pat. No. 5,242,866.

[51] Int. Cl.⁶ .......................... C04B 35/00; C04B 35/56
[52] U.S. Cl. ........................................ 501/12; 501/88
[58] Field of Search ............................. 501/12, 88

[56] References Cited

U.S. PATENT DOCUMENTS

| | | | |
|---|---|---|---|
| 2,766,220 | 10/1956 | Kantor | 556/43.4 |
| 2,793,222 | 5/1957 | Kantor et al. | 556/43.4 |
| 3,109,826 | 11/1963 | Smith | 260/18 |
| 3,197,432 | 7/1965 | Lamoreaux | 260/46.5 |
| 3,197,433 | 7/1965 | Lamoreaux | 260/46.5 |
| 3,271,362 | 9/1966 | Chalk et al. | 260/46.5 |
| 3,378,431 | 4/1968 | Smith et al. | 161/1 |
| 3,439,014 | 4/1969 | Patton et al. | 260/448.2 |
| 3,957,717 | 5/1976 | Harada et al. | 260/37 |
| 4,472,510 | 9/1984 | January | 501/12 |
| 4,618,591 | 10/1986 | Okamura et al. | 501/90 |
| 4,618,666 | 10/1986 | Porte | 528/33 |
| 4,935,479 | 6/1990 | Lau et al. | 528/27 |
| 4,981,820 | 1/1991 | Renlund et al. | 501/39 |
| 5,180,694 | 1/1993 | Renlund et al. | 501/12 |
| 5,242,866 | 9/1993 | Leung et al. | 501/12 |

FOREIGN PATENT DOCUMENTS

| | | |
|---|---|---|
| 0178191A1 | 4/1986 | European Pat. Off. |
| 0490401 | 6/1992 | European Pat. Off. |
| 4016569A1 | 12/1990 | Germany |
| 4033493A1 | 5/1991 | Germany |
| 1359576 | 7/1974 | United Kingdom |

OTHER PUBLICATIONS

Elmer & Meisser (Journal of American Ceramic Society, 59, 206, (1976) no month available.

R. M. Laine et al., Chem. Mater. (1990) no month available, 2,464-472.

Russian Journal Vysokomolekulyarnye Soedineniya, Serial A, 16 (10), 2345-50 (1974) no month available.

*Primary Examiner*—David Brunsman
*Attorney, Agent, or Firm*—Harold N. Wells; Roger H. Criss

[57] ABSTRACT

Carbon-containing black glass compositions of matter having the empirical formula $SiC_xO_y$ and derived from the polymer precursors having the residue

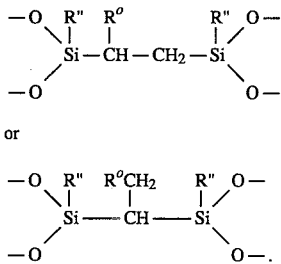

4 Claims, No Drawings

CARBON-CONTAINING BLACK GLASS MONOLITHS

CROSS REFERENCE TO RELATED APPLICATIONS

This application is a division of application Ser. No. 07/816,269, filed Dec. 23, 1991 now U.S. Pat. No. 5,328,976 which is continuation-in-part of U.S. Ser. No. 07/002,049, filed Jan. 9, 1987 now U.S. Pat. No. 5,242,866.

BACKGROUND OF THE INVENTION

Ceramics have been known for many hundreds of years and have been used as coatings or as fabricated parts and are employed wherever their characteristics such as durability, nonporosity, electrical conductivity or nonconductivity, and heat protection are required. One of the more recent ceramic materials is a silicon-carbon-oxygen system, named as a black glass, which can find use in certain situations where extremely high temperatures are present.

Traditionally, the introduction of carbon in glasses was made by impregnating porous glass with a concentrated solution of an organic compound and subsequently firing in a reducing or neutral atmosphere. The carbon-containing product is generally regarded as a composite containing carbon and silica. Elmer and Meissner (*Journal of the American Ceramic Society*, 59, 206, 1976) of Corning Glass Works reported that the annealing point of reconstructed 96% silicon dioxide glasses is markedly increased by incorporating carbon in porous glass. Furfuryl alcohol was used as the pyrolyzable organic compound. They attributed the increase of about 100° C. in annealing point to the effect of hydroxyl removal from the internal surface of the porous glass by hydroxyl reaction with carbon. The resistivities of samples with less than 2% carbon content approached that of the glass whereas the electrical resistivities of carbon-containing silica with carbon between 4.5–7% are in the range of 1–3 ohm-cm, thus producing electrically conductive glasses. The highest carbon content in the final glasses they could produce is 8.59%.

Smith & Crandall reported in U.S. Pat. No. 3,378,431 a method of making carbon-containing glass by hot-pressing to sintering temperature a mixture of colloidal silica and an organic compound known in the trade as "Carbowax" (polyethylene glycol) in an oxygen-free atmosphere. The black glass obtained from the mixture of 33% "Carbowax" and 67% silicon dioxide showed the presence of 1.2% by weight of carbon. A devitrification-resistant bonded mass of vitreous silicon dioxide and carbon physically inseparable and microscopically indistinguishable from silica was obtained. The black glass has a low thermal diffusivity and more resistance to crystallization than pure vitreous silica. Devitrification temperature increased by 150° C. to 1250° C. as compared with colloidal silica.

Carbon-modified silica glass has been used as a composite matrix by Larsen, Harada and Nakamum (Report No. AFWAS-TR-83-4134, December, 1983, Wright-Patterson AFB, Ohio). In producing fiber-reinforced composites, the processing sequence includes slurry impregnation of silicon carbide fiber in an aqueous slurry of a carbowax (polyethylene glycol) and a silicon-containing compound known in the trade as Cab-O-Sil (a silicon dioxide powder manufactured by Cabot), layout of prepregged fiber tows, and hot-pressing. The composites thus obtained exhibited high porosity and brittle fracture indicative of low toughness.

They concluded that the silicon carbide/black glass fiber composite is a promising material, although the property goals were not achieved. There is suspicion that the silicon carbide fibers may have degraded.

More recently, formation of carbonaceous ceramics has been carried out through the use of the sol-gel process. January discloses in U.S. Pat. No. 4,472,510 the use of the sol gel process to form monolithic glasses containing carbon through pyrolysis of the gels of organosilsesquioxanes, metal oxides and metal alkoxides. Monomann in Great Britain Patent 1,359,576 disclosed the formation of silicon and quartz fibers using silsesquioxanes as precursors. Their gelling process used selected organosilicon compounds for the preparation of the ceramic precursor based on the following reaction:

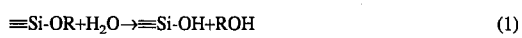

$$\equiv\text{Si-OR} + \text{H}_2\text{O} \rightarrow \equiv\text{Si-OH} + \text{ROH} \qquad (1)$$

$$\equiv\text{Si-OH} + \text{HO-Si}\equiv \rightarrow \equiv\text{Si-O-Si}\equiv + \text{H}_2\text{O} \qquad (2)$$

in which R represents an organic radical such as alkyl groups and aryl groups such as phenyl group.

The uniqueness of the sol-gel process is the ability to obtain homogeneous, purer glassy products by low temperature processes. Also, the use of a liquid sol as the starting material allows the preparation of intractable monoliths of complicated shapes utilizing a liquid path. The advantages of such a procedure over the powder consolidation techniques, such as sintering and hot isostatic pressing, are their formability of complicated shapes and low temperature operation. However, monolithic black glasses produced via hydrolysis and condensation of organoalkoxysilanes are not practical because of the requirement for very long drying periods and delicate gelling conditions. For example, January prepared a 0.66 cubic centimeter methyltrimethoxysilane gel monolith over a drying period of about three weeks, which, upon pyrolysis, yielded a carbon-containing black glass monolith of density 1.6 grams per milliliter.

The very slow drying rate is necessary for reducing cracks during the gelation period. These cracks form as a result of the non-uniform surface tensions created by the evaporation of the split-off water or alcohol molecules in the hydrolysis (1) and condensation (2) reactions.

Silsesquioxanes have also been produced by titanium catalyzed redistribution of methylhydrooligo-and-polysiloxanes by R. M. Laine et al., in *Chem. Mater.* 1990, 2, 464–472. A gaseous by-product (methyl silane, b.p. −57° C.) is produced during the redistribution reaction.

In the instant invention, a hydrosilylation reaction was used for the gelation process in place of the hydrolysis-condensation route. The hydrosilylation involves addition of silane (Si-H) to vinyl silane (Si-CH=CH$_2$) to form an ethylene or methylene linkage as illustrated in the following equations:

$$\equiv\text{Si-H} + \text{CH}_2=\text{CH-Si}\equiv \longrightarrow \equiv\text{SiCH}_2\text{CH}_2\text{Si}\equiv \qquad (3)$$

or

$$\equiv\text{Si-H} + \text{CH}_2=\text{CH-Si}\equiv \longrightarrow \equiv\text{SiCH}_2\overset{\text{CH}_3}{\underset{|}{\text{CH}_2}}\text{Si}\equiv \qquad (4)$$

The features of the hydrosilylation reaction are such that there is neither a small molecule reaction product nor a weight loss during gelation and that the carbons in the ethylene linkage are bonded to the silicon atoms. This gelation reaction completely eliminates the drying problem inherent in the hydrolysis of organoalkoxysilane process. We also found that cyclosiloxane gels cross-linked by hydrosilylation reaction produced upon pyrolysis to high temperature in a non-oxidizing atmosphere high carbon content, high yield and high density black glasses.

N. Harada and M. Tanaka in U.S. Pat. No. 3,957,717 described and claimed an organopolysiloxane gel prepared from cyclosiloxanes and H. Lamoreaux in U.S. Pat. Nos. 3,197,432 and 3,197,433 claimed the product gel from reacting cyclosiloxanes containing hydrogens and vinyl groups. The basic idea of reacting silyl hydrogen groups with silyl vinyl groups is found in U.S. Pat. Nos. 3,439,014 and 3,271,362.

Monomann in Great Britain Patent 1,359,576 disclosed the use of a phenyl group rather than a methyl group as R in order to increase the carbon content of their products. By choosing phenyl group as R, the carbon weight percent can be increased to as high as ca. 30%. However, we have shown in our simulation experiments that the carbon present started to oxidize at 550° C. in flowing air and was completely removed before 1000° C. Therefore, the carbon derived from pyrolysis of the phenyl group is free carbon susceptible to oxidation while our invention results in a carbon-containing material that is oxidation resistant up to about 1400° C.

Okamura et al. reported in U.S. Pat. No. 4,618,591 a method of making silicon carbide-carbon composite molded product by using polycarbosilane as the precursor for a matrix material. The polycarbosilane on pyrolysis forms microcrystalline silicon carbide with inclusion of low oxygen percentage, as indicated by their X-ray diffraction patterns. In contradistinction to this work, this invention produces materials that have different composition ranges and that are overwhelmingly amorphous with a few small diffraction peaks different from silicon carbide.

The stability of a soluble polymer was studied by thermogravimetric analysis by A. Zhdanov et al. and reported in the *Russian Journal Vysokomolekulyarnye Soedineniva*, Series A, 16 (10), 2345–50 (1974). They precipitated the highly branched, soluble polymer from the reaction mixture as powders by adding alcohols into the reaction vessel before the gel point. Their polymer was different from a network gel produced from a sol-gel process in that it contained a large amount of unreacted Si-H and Si-CH=CH$_2$ groups and was readily soluble in aromatic solvents. Also, the polymer powder did not melt when heated up to 500° C. They heated the soluble polymers at 10° C. per minute up to a maximum of 780° C. in both Argon and air and reported the thermogravimetric results as to weight loss at various stages of heating and as to the total weight loss involved. No weight change was observed beyond 780° C. when heated in Argon at a rate of 10° C./min. with a final yield of 87%. The Russians did not characterize the resultant product of this analysis and appeared to have no interest in this product.

In contradistinction to this prior work, this invention is concerned with the product of pyrolysis of the gel polymers formed from cyclosiloxanes as well as with the process to produce such a product. The product of our invention is a hard, glassy material which we call a black glass having oxidation-resistant carbon and which is very useful when cast as a monolith, or one piece object.

BRIEF SUMMARY OF THE INVENTION

This invention relates to a composition of matter in which greater amounts of carbon are incorporated by bonding to silicon than were possible utilizing prior art. More specifically, the invention is concerned with a carbon-containing black glass composition of matter in which up to about 40% carbon is incorporated by weight to produce an oxidatively stable and high melting substance.

As was hereinbefore discussed, there is a need for a thermally stable, oxidative-resistant, and devitrification-resistant black glass. Such a material would find high temperature use and would be economically attractive when prepared by the present method in which a polymer would be formed at a low temperature followed by pyrolysis at temperatures in the range of about 700° C. to about 1400° C. Our invention has the advantage of producing a silica-modified glass having a higher melting point than cristobalite and having greater resistance to devitrification than pure vitreous silica and previously known carbon-containing glasses. Our invention also yields a carbon-containing glass having higher thermal stability in air than known nonoxide ceramics containing carbon.

In one aspect, an embodiment of this invention resides in a carbon-containing black glass ceramic composition of matter having the empirical formula $SiC_xO_y$ wherein x is greater than zero and up to about 2.0, preferably up to about 1.6 and y is greater than zero and up to about 3.2, preferably up to about 1.8.

Another aspect of this invention is found in a process to produce a black glass comprising making a polymer by reacting, in the presence of a catalytic effective amount of a hydrosilylation catalyst, (a) a cyclosiloxane monomer of formula

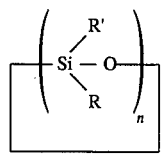

where n is an integer from 3 to about 20, R is hydrogen, and R' is an alkene of from 2 to about 20 carbon atoms in which one vinyl carbon is directly bonded to silicon or (b) two or more different cyclosiloxane monomers of the formula of (a) where for at least one monomer R is hydrogen and R' is an alkyl group having from 1 to about 20 carbon atoms, and for the other monomers R is an alkene of from 2 to about 20 carbon atoms in which one vinyl carbon is directly bonded to silicon and R' is an alkyl group of from 1 to about 20 carbon atoms, or (c) cyclosiloxane monomers having the formula of (a) where R and R' are independently selected from hydrogen, an alkene of from 2 to about 20 carbon atoms in which one vinyl carbon atom is directly bonded to silicon, or an alkyl group of from 1 to about 20 carbon atoms and at least one of said monomers contains each of said hydrogen, alkene, and alkyl moieties, heating the resulting polymer in a non-oxidizing atmosphere to a temperature in the range of from about 800° C. to about 1400° C. or in an oxidizing atmosphere at a rate exceeding 5° C./min to the same temperature range, to produce a black glass.

In another aspect, the invention relates to a black glass produced by heating a polymer containing the moieties

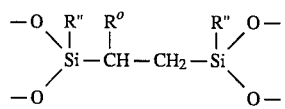

-continued or

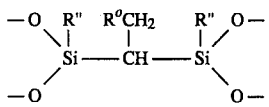

where $R^o$ is the unreacted residue of an alkene having 2 to 20 carbon atoms

R" is H, an alkyl group having 1 to 20 carbon atoms, or an alkene having 2 to 20 carbon atoms in a non-oxidizing atmosphere to a temperature in the range of from about 800° C. to about 1400° C. to produce black glass, or in an oxidizing atmosphere at a rate exceeding 5° C./min, preferably 50° C./min to 1000° C./min most preferably greater than 100° C./min, to the same temperature range.

In still another aspect the polymer moieties are derived from the reaction of cyclosiloxane monomers containing silicon-vinyl bonds and/or silicon-hydride bonds or the reaction of cyclosiloxane monomers containing silicon-hydride bonds with acetylene, or the reaction of cyclosiloxane monomers containing two hydride bonds attached to a silicon atom with cyclosiloxane monomers containing silicon-vinyl bonds.

DETAILED DESCRIPTION OF THE INVENTION

Precursor Polymers

The black glass of the invention is derived from cyclosiloxane polymer precursors. In one embodiment, the precursor polymers are prepared by the reaction of cyclosiloxanes containing a silicon-hydride bond and/or a silicon-vinyl bond, as defined below. For example, such polymers may be described as the reaction product of (a) a cyclosiloxane monomer of the formula

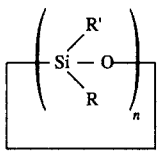

where n is an integer from 3 to about 20, R is hydrogen, and R' is an alkene of from 2 to about 20 carbon atoms in which one vinyl carbon is directly bonded to silicon or (b) two or more different cyclosiloxane monomers of the formula of (a) where for at least one monomer R is hydrogen and R' is an alkyl group having from 1 to about 20 carbon atoms, and for the other monomers R is an alkene of from 2 to about 20 carbon atoms in which one vinyl carbon is directly bonded to silicon and R' is an alkyl group of from 1 to about 20 carbon atoms, or (c) cyclosiloxane monomers having the formula of (a) where R and R' are independently selected from hydrogen, an alkene of from 2 to about 20 carbon atoms, in which one vinyl carbon atom is directly bonded to silicon, or an alkyl group of from 1 to about 20 carbon atoms and at least some of said monomers contain each of said hydrogen, alkene, and alkyl moieties, said reaction taking place in the presence of an effective amount of a hydrosilylation catalyst.

Other methods of preparing such cyclosiloxane polymers may be employed. For example, the cyclosiloxane monomer defined above may contain only hydrogen atoms rather than vinyl or alkyl groups, that is R and R' are only hydrogen. Such a cyclosiloxane could be reacted with acetylene or substituted acetylenes to provide the same linking moiety between two cyclosiloxane groups. This could be accomplished at temperatures of about 25° to 200° C. and pressures of about 1 to 14,000 kPa using platinum, chloroplatinic acid, tris(triphenylphosphine) Rhodium (I) chloride, or tris(triphenyl phosphine) Ruthenium (II) chloride as a catalyst. Alternatively, a cyclosiloxane containing a single hydrogen atom and a methyl group attached to the silicon atom could be reacted with acetylene in a similar manner.

Another procedure related to the methods described above is the reaction of a cyclosiloxane containing only hydrogen atoms attached to a silicon atom with cyclosiloxanes containing vinyl groups attached to the silicon atoms.

The objective of the methods described and others which may occur to those skilled in the art is to provide polymers containing the moieties

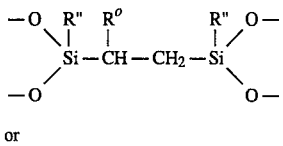

or

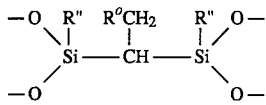

where $R^o$ is the unreacted residue of an alkene having 2 to 20 carbon atoms

R" is H, an alkyl group having 1 to 20 carbon atoms, or an alkene having 2 to 20 carbon atoms Since the cyclosiloxane molecules are linked by the reaction of a hydrogen atom from one molecule and an alkene from the other, the residual group $R^o$ could result from species of R and R' previously described. Thus, $R^o$ could be hydrogen or an alkyl group of 1 to 18 carbon atoms or an alkene group of 1 to 18 carbon atoms containing unsaturation in addition to the reactive vinyl group. It is believed that the improved high temperature performance of black glass of the invention is related to the relatively close coupling of the silicon and carbon atoms.

In a preferred embodiment the polymer precursor of the present invention may be prepared by heating a mixture of cyclosiloxane monomers containing silicon-hydride and silicon-vinyl bonds to a temperature in the range of from about 10° C. to about 300° C. in the presence of a platinum hydrosilylation catalyst present at 1–200 ppm for a time in the range of from about 1 minute to about 600 minutes. The resulting polymer is converted to black glass by pyrolyzing in an inert atmosphere at a temperature in the range from about 800° C. to about 1400° C. for a time in the range of from about 1 hour to about 300 hours, or by rapid heating in an oxidizing atmosphere. The polymer formation step from the monomer takes advantage of the fact that a silicon-hydride will react with a silicon-vinyl group to form a silicon-carbon-carbon-silicon or a silicon-carbon-silicon bonded chain, thereby forming a network polymer. Thus, the reacting monomeric cyclosiloxanes contain either a silicon-hydride bond or a silicon-vinyl bond or both. A "silicon-hydride bond" refers to the presence of a silicon atom bonded directly to a hydrogen atom and a "silicon-vinyl bond" refers to the presence of a silicon atom bonded directly to an alkene carbon atom i.e. an atom which is attached by a double bond to an adjacent carbon atom.

The pyrolysis chemistry of the gel polymer in this invention is distinctly different from that reported by A. Zhdanov et al. in that their soluble polymer did not have any reaction above 780° C. in a fast heating of 600° C. per hour. As discussed hereinbefore, this soluble cyclosiloxane precursor is also chemically different from a gel polymer. The gel polymers in this invention cannot be dissolved in solvents such as toluene. In contrast, conversion of the gel polymer to black glass by heating in an inert atmosphere takes place between 430° C. and 950° C. Three major pyrolysis steps were identified by thermogravimetric analysis at 430°–700° C., 680°–800° C. and 780°–950° C. The yield of the gel-glass conversion is 83%; the third pyrolysis mechanism occurring between 780° C. and 950° C. contributed the final 2.5% weight loss to the final product.

The invention can be practiced by utilizing a polymer precursor cyclosiloxane wherein both the requisite silicon-hydride bond and the silicon-vinyl bond are present in one molecule. For example, 1,3,5,7-tetravinyl-, 1,3,5,7-tetrahydrocyclotetrasiloxane would operate within the scope of this invention since this molecule has the basic requirement of a silicon-hydride bond and a silicon-vinyl bond and would polymerize to give a black glass polymer precursor of use in this invention.

Platinum is the preferred hydrosilylation catalyst. Other catalysts such as cobalt and manganese carbonyl will perform adequately. The catalyst can be dispersed as a solid or can be used as a solution when added to the cyclosiloxane monomer.

Cyclosiloxanes are the preferred silicon containing compounds for effecting the gel monoliths. Examples of cyclosiloxanes include, but are not limited to,
1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane,
1,3,5,7,9,11,13,15,17,19,21,23,25,27,29-pentadecavinylpentadecahydrocyclopentadecasiloxane,
1,3,5,7-tetrapropenyltetrahydrocyclotetrasiloxane,
1,3,5,7-tetrapentenyltetrapentylcyclotetrasiloxane and
1,3,5,7,9-pentadecenylpentapropylcyclopentasiloxane.
1,3,5,7,9-pentahydropentamethylcyclopentasiloxane
1,1,3,3,5,5,7,7-octahydrocyclotetrasiloxane
1,1,3,3,5,5,7,7,9,9,-decahydrocyclopentasiloxane
1,1,3,3,5,5,7,7,9,9,11,11-dodecahydrocyclohexasiloxane From a broader perspective, the black glass of the invention may be derived from polymers which contain he moieties

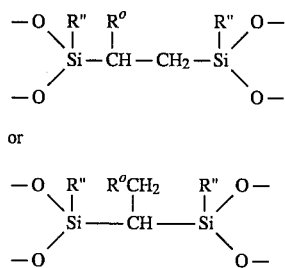

where
$R^o$ is the unreacted residue of an alkene having 2 to 20 carbon atoms
R" is H, an alkyl group having 1 to 20 carbon atoms, or an alkene having 2 to 20 carbon atoms The polymers described by the reaction of cyclosiloxanes having silicon-hydride bonds with those having silicon-vinyl bonds will contain residues of these types. Thus the reaction of various types of cyclosiloxanes could produce polymers of the invention, as already suggested. In addition, the linking of cyclosiloxane monomers by the reaction of acetylene with silicon-hydride moieties could produce such polymers. Other reactions which result in polymers having these linkages between cyclosiloxane molecules would be expected to provide precursors to black glass of the invention.

Producing Black Glass

One of the most useful methods utilized in the process of this invention is to fabricate the polymer precursor into a monolith using procedures like tape casting, injection molding, reaction injection molding, and compression molding. For instance, the polymer forming cyclosiloxane mixture may be introduced into a mold and then heated to form the polymer monolith black glass precursor or extruded through a heated die to form a precursor polymer monolith. The monolith would then be pyrolyzed up to about 1400° C. to form the black glass monolith.

Also considered as within the scope of this invention is impregnating the black glass product of this invention with cyclosiloxane monomer reaction mixture, the best results coming from pressure or vacuum impregnation with subsequent pyrolysis to afford a black glass product with less cracks and voids and with greater density. Impregnation can be repeated to further increase the density of the black glass product of this invention.

The monomeric mixture can include a filler such as cubic or hexagonal silicon carbide, silicon nitride, silica, alumina, hafnia, titania, and zirconia to strengthen the resulting monolith. Such a filler in the form of a powder, whisker, or fiber can be mixed into the monomer using conventional means. The filled product produced by the process of this invention shows not only increased strength but also exhibits controlled shrinkage upon the pyrolysis step. Pyrolysis of the precursor polymers changes these polymers into very hard ceramic bodies that can find application in high temperature, oxidation-resistant, high strength composite matrices and castable ceramics.

It has been discovered that application of pressure to the monomer mixture during the polymer forming operation will prevent nucleate bubbling of the reactants and decrease reaction time in that higher temperatures can be employed. Bubbling is to be avoided since it causes voids and cracks to form in the incipient polymer and thereby weakening the finished product. In the reaction of this invention bubbling occurs whenever the filler content of the monomer mixture is in excess of about 20% by weight. Therefore, it is preferred to perform the polymerization of this invention under a pressure in the range of from 14 psi to about 30,000 psi so as to produce crack-free nearly voidless polymers. The application of increased pressure will also hasten the reaction time for unfilled polymer formation. The term "crack-free" should be read to mean free of visible cracks.

Harada and Tanaka have shown in their control experiment that the cured product obtained from a mixture of 175 parts of cyclotetrasiloxanes and 200 parts of quartz flour was found to have cracks and to be unusable. In their invention, 100 parts of an organopolysiloxane composed of the triorganosiloxy and silicon dioxide groups was added to the cyclotetrasiloxanes sol, resulting in a cured product free from crack defects. Their monomer composition thus prepared is curable at a temperature in the range from room temperature to 100° C. Our invention of high pressure polymerization of cyclosiloxanes by hydrosilylation reaction not only can produce cured thick-walled products without cracking and gas pockets, but also allows the use of polymerization temperatures higher than 100° C. and higher platinum concentration, thus shortening the reaction time for polymerization.

The black glass composition of matter has an empirical formula $SiC_xO_y$ wherein x is greater than zero and up to about 2.0, preferably up to about 1.6, and y is greater than zero and up to about 3.0, up to about 1.8. The carbon content ranges up to about 40%. No other method known in the art can achieve such a high carbon content black glass wherein the carbon is resistant to oxidation at high temperatures.

As discussed herein before, January and Monomann were able to produce high carbon black glasses from precursors different from this invention but their glass contained low densities around 1.6 and the carbon was easily oxidized at low temperature. Using the process of our invention, the carbon contained in the black glass is resistant to oxidation and our densities are about 2.1 grams per milliliter. In addition, the prior work utilizing silicon hydrolysis had extremely slow fabrication times for monoliths on the order of weeks, whereas our invention can form the polymer monoliths in the order of minutes with higher yield than those made from hydrolysis reactions of silicon. Our monoliths can be formed into larger shapes than the hydrolysis black glasses.

Our invention can be used to manufacture non-porous as well as porous black glass. For most purposes it is preferred to use neat cyclosiloxanes to form non-porous black glass, but porous black glass can be formed if so desired by starting with solvent based cyclosiloxane monomers. The use of pressure will provide crack-free polymers where the same reaction mixture run at atmospheric mixture provides a polymer containing cracks.

EXAMPLE I

Ten milliliters of tetravinyltetramethylcyclotetrasiloxane was mixed with 7.2 milliliters of a mixture of cyclosiloxanes containing from 3 to about 6 silicon atoms and called methylhydrocyclosiloxane and 0.05 milliliters of platinum-divinyltetramethyldisiloxane complex containing 3% platinum in xylene was added to the above mixture. After heating to about 60° C. for one hour a toluene insoluble gel polymer (Polymer A) was formed. The resultant polymer was then pyrolyzed in nitrogen at a heating rate of 200° C. per hour to about 1200° C. resulting in formation of a carbon containing black glass. The weight loss was about 17% for the overall process and the skeleton density for the ground black glass powder was about 2.10 grams per milliliter. The carbon-containing black glass lost less than 0.6% by weight when heated in flowing air to about 1150° C. at a heating rate of 10° C. per minute in a thermogravimetric analysis. X-ray analysis of this black glass indicates that this material is largely amorphous and that the sample had a few small diffraction peaks, which was different from crystalline silicon carbide. Elemental composition gave the formula $SiC_{1.37}O_{1.03}$ for the black glass and the black glass contained <0.1 weight % hydrogen and <0.3 weight % nitrogen.

EXAMPLES II–VIII

These examples were all performed as described in Example I with the exception that different volume amounts of tetravinyltetramethylcyclotetrasiloxane (T) and methylhydrocyclosiloxane (M) were utilized to make the black glass. The results of these experiments are presented in Table 1 below where T/M is a volume ratio. The data shows that the silicon bonded carbon content can be varied and this variation is controllable within ±1%. Thermogravimetric analysis in flowing air showed that powder samples from Examples II–VIII had less than 0.5% weight loss when heated to 1150° C.

TABLE 1

| | Composition Tables | | | |
|---|---|---|---|---|
| Example | T/M | Pyrolysis Yield | Carbon wt. % in black glass | Empirical Formulae |
| II | 8/2 | 67% | 29.8% | $SiC_{1.45}O_{0.89}$ |
| III | 7/3 | 79% | 28.0% | $SiC_{1.51}O_{1.17}$ |
| IV | 6/4 | 82% | 27.2% | $SiC_{1.36}O_{0.98}$ |
| V | 5/5 | 83% | 24.6% | $SiC_{1.30}O_{0.95}$ |
| VI | 4/6 | 84% | 24.1% | $SiC_{1.23}O_{1.16}$ |
| VII | 3/7 | 77% | 21.7% | $SiC_{1.08}O_{1.17}$ |
| VIII | 2/8 | 57% | 19.4% | $SiC_{1.01}O_{1.39}$ |

EXAMPLE IX

The pyrolysis mechanism was investigated by thermogravimetric analysis (TGA). 29.93 mg of the gel polymer obtained from Example I was heated under flowing nitrogen at a heating rate of 10° C. per minute to 1100° C. The total weight loss was 17%. Results for the controlled pyrolysis are summarized in Table II below.

TABLE II

| TGA Results for Pyrolysis of Polymer Gel | |
|---|---|
| Temperature Range | Weight Loss |
| 80° C.–430° C. | 0.3% |
| 430° C.–605° C. | 5.0% |
| 605° C.–690° C. | 5.0% |
| 690° C.–745° C. | 2.0% |
| 745° C.–785° C. | 2.0% |
| 785° C.–950° C. | 2.5% |
| Total | 16.8% |

The ceramic conversion occurred in the 430° C.–950° C. temperature range. The derivatives of the TGA curve indicated three major pyrolysis mechanisms at 430°–700° C., 650°–800° C. and 780°–900° C. The third pyrolysis step accounted for ca. 15% of the total weight loss.

EXAMPLE X 10 ml of phenyltriethoxysilane was mixed with 10 ml of tetraethoxysilane in a beaker, 2.8 ml of 1.0M acetic acid was added, and the solution was adjusted to about pH 1 by adding several drops of concentrated hydrochloric acid. The gel produced by this method was pyrolyzed in nitrogen to 1200° C. at a heating rate of 200° C. per hour to give 66.1% of a foam material with a 22.6% carbon content by weight. Thermogravimetric analysis of the black glass foam was performed in flowing air at a heating rate of 20° C. per minute to 1150° C. and showed a loss in weight of 20.38% which began at around 550° C. The color of the sample turned white, indicating that the residue is silica and the carbon is not oxidation resistant as would be expected if the carbon was bound to the silicon structure rather than being present as a mixture of graphite in silica.

A second example using 20 ml of phenyl triethoxysilane was reacted with 4 ml of tetraethoxysilane as in the first example reported above to give a 66% yield of a porous product containing 35.0% carbon by weight. Thermogravimetric analysis of this product showed a weight loss of 34.05%, again demonstrating that the carbon present is not resistant to oxidation at high temperatures as is the carbon present in the black glass made in Examples I–VIII.

EXAMPLE XI

A sol mixture was prepared as described in Example I and silicon carbide whiskers (Tateho) were suspended in said mixture by ultrasonic agitation for from 15 to about 30 seconds resulting in a stable suspension of the whiskers. Polymerization of the suspension occurred after 120 minutes heating at 50° C. affording a rigid 3.5 centimeter diameter composite cylinder with about 13% by weight whisker content. Pyrolysis of this cylinder at 200° C. per hour up to a temperature of about 1200° C. gave a cylinder whose diameter had contracted by about 20%.

EXAMPLE XII

In like manner as described in Example I, a mixture was prepared and then polymerized at about 90° C. in about 10–15 minutes under a pressure of 70 psi. Gelation took about 90 minutes if the temperature is lowered to 55° C. and the pressure is atmospheric. An increase in pressure then allows higher temperature polymerization and affords much shorter polymerization times. Under atmospheric pressure, the sol liquid with 90 ppm Pt started to foam when gelation temperature was over 65° C.

EXAMPLE XIII

A mixture was prepared in like manner as described in Example I and 50 weight percent of silicon carbide powder was added to said mixture. Polymerization occurred at 85° C. and 70 psi in 15 minutes without bubble formation. In atmospheric pressure operation it is not possible to obtain bubble-free samples for filler loadings exceeding about 20% by weight filler since the filler acts to produce nucleate bubbling as the temperature is raised.

EXAMPLE XIV

For purposes of this example and for use in the following Examples XV–XX, a standard mixture of cyclosiloxane monomers was prepared from T, tetravinyltetramethylcyclotetrasiloxane, and M, a commercial mixture of methylhydrocyclosiloxanes when the silicon atoms number from 4–6, in the ratio of 5.7 T to 4.3M in the presence of 90 ppm platinum.

In this example 4 milliliters of the standard mixture was placed in a polypropylene tube and heated at 55° C. in an oven for 90 minutes to form a polymer which was subsequently hardened at 80° C. for 30 minutes. The polymer exhibited a smooth surface and no cracks after removal from the polypropylene tube. Pyrolysis of this polymer in nitrogen to 1200° C. at the rate of 200° C. per minute afforded a black glass with a bulk density of 2.05 g/ml exhibiting a diameter shrinkage of about 21% and a reduction in volume to about 49% of initial volume.

EXAMPLE XV

Twelve milliliters of the mixture of Example XIV was mixed with 3 grams of alpha silicon carbide powder with ultrasonic agitation and heated to 40° C. for 15 minutes. The resultant mixture was poured into an 11 mm×11 mm×55 mm copper case and placed in a pressure vessel under 90 psig. The pressurized container was placed in a 60° C. water bath for 60 minutes to polymerize the monomers. The polymer was heated in a 90° C. oven for one hour, and then taken out of the copper case. The filled polymer had dimensions of 1.44 cm×1.44 cm×4.60 cm and exhibited a smooth surface and no cracks. Pyrolysis under nitrogen at 200° C. per hour up to 1200° C. produced a 1.14 cm×1.14 cm×3.60 cm black glass object with uniform shrinkage, as to height and width, of 19.0% and a final volume of 52.9% of the initial volume.

The black glass was then impregnated under vacuum with the starting mixture, polymerized at 55° C. for 80 minutes, cured at 90° C. for 60 minutes, and pyrolyzed to 1200° C. as before. The pyrolyzed black glass exhibited no change in dimensions and weighed 10.28 grams with a density of 2.3 g/ml. The silicon carbide was present in the black glass at 23% by weight.

EXAMPLE XVI

A comparison experiment was run as described in Example XV but without a pressurized vessel. The resultant polymer exhibited gas pockets and cracks after curing at 55° C. for 90 minutes. A similar non-pressurized sample was cured at 35° C. for 16 hours and exhibited cracks and gas pockets. When a similar mixture was cured at 22° C. for 48 hours, the polymer did not exhibit cracks and gas pockets but sedimentation of the alpha silicon carbide powder occurred and resulted in a clearly defined boundary layer in the polymer.

EXAMPLE XVII

Eleven grams of a starting mixture as described in Example XIV was mixed with 7 grams of alpha silicon carbide powder (39.3% by weight) by ultrasonic dispersion, placed in a cylindrical aluminum case with an interior diameter of 18 mm and a height of 74 mm, pressurized to 110 psig, immersed in an 85° C. water bath for 15 minutes, heated in a 100° C. oven for one hour, and the filled polymer was then removed from the case and exhibited a smooth surface having no cracks with a diameter of 18 mm and height of 48 mm. Upon pyrolysis to 1200° C. at 200° C. per hour under nitrogen, the filled black glass exhibited a 15 mm diameter with a height of 41 mm, a weight of 16.34 grams, a density of 2.2 g/ml, and contained 43% by weight of silicon carbide powder.

EXAMPLE XVIII

In like manner as in Example XVII, a 61% alpha silicon carbide filled monomer mixture was prepared from 16 grams of alpha silicon carbide powder and 10 ml of monomer mixture. This mixture was heated at 40° C. for 20 minutes, the slurry was then poured into an 11 mm interior diameter polypropylene tube, the tube was pressurized to 110 psig and heated for 8 minutes at 80° C. and aged at 85° C. for 30 minutes, and the polymer was removed and exhibited a smooth surface and no cracks. Pyrolysis to 1200° C. under nitrogen at 200° C. per hour gave a filled black glass with a diameter of 8.7 mm and a height of 45.7 mm, a weight of 6 grams, a density of 2.23 g/ml, and contained 66% by weight of silicon carbide.

EXAMPLE XIX

In like manner as in Example XVIII, 14.5 ml of monomer mixture was combined with 5.5 grams of silicon carbide whiskers and the whiskers were dispersed ultrasonically. The slurry was then poured into a 58 mm ×18mm×12 mm rectangular aluminum mold and polymerized at 50° C. for 3 hours when the polymer was separated from the mold and exhibited cracks and gas pockets. Pyrolysis was performed at 200° C. per hour under nitrogen to 1200° C. resulting in a black glass with a 17.8 g (86.6% yield) having dimensions of 50 mm×15 mm×11 mm and a final volume of 67% of the initial volume. The density was 2.16 g/ml and 32% by weight of the filled black glass was silicon carbide whisker.

EXAMPLE XX

As described in Example XIX, the standard monomer mixture was heated at 40° C. for 30 minutes and then 10 milliliters was mixed with 2.99 grams of silicon carbide whiskers. This mixture was divided into two parts. One part was polymerized at 55° C. at atmospheric pressure for 90 minutes and produced a polymer exhibiting gas pockets and surface cracks. The second part was polymerized under 70 psig at 85° C. for 15 minutes giving a polymer exhibiting a smooth surface and no cracks. This experiment shows the importance of pressure in shortening the reaction time and in producing a crack-free product.

EXAMPLE XXI

A sol solution, prepared as described in Example II was mixed with silicon carbide fibers (Nicalon™- manufactured by Nippon) in a 1.9 millimeter glass vial. The mixture was polymerized at 52° C. for about two hours resulting in a crack-free fiber-reinforced polymer monolith. Controlled pyrolysis, wherein the temperature was raised 200° C. per hour until a final temperature of 1200° C. was reached, resulted in the formation of a black glass monolith with the same diameter as the pre-fired polymer monolith, a result that was not shown by the unreinforced polymer of Example II. The Nicalon fiber-reinforced monolith had a density of 1.0 grams per milliliter and contained about 9.7% by weight silicon carbide fiber.

The black glass monolith was impregnated, under vacuum, with monomer mixture and pyrolyzed in nitrogen to 1200° C. at 200° C. per hour to give a monolith with a density of 1.4 grams per milliliter. A second impregnation with monomer mixture followed by further pyrolysis gave a black glass monolith with a density of 1.6 grams per milliliter.

EXAMPLES XXII

A cyclosiloxane where R and R' groups are only hydrogen, i.e., 1,1,3,3,5,5,7,7-octahydrocyclotetrasiloxane is reacted with a cyclosiloxane where R and R' groups are partly vinyl, i.e., tetravinyltetramethylcyclotetrasiloxane in the presence of platinum divinyl tetramethyl disiloxane complex containing 3% platinum at a temperature of about 60° C. for one hour to form a polymer. The product is pyrolyzed in nitrogen to form a black glass as described above.

EXAMPLE XXIII 60.09 grams of hydromethylcyclosiloxane (mixture of trimer, tetramer, pentamer, hexamer and heptamer) (HMCS), 13.0 grams of acetylene and 0.10 gram of chloroplatinic acid are charged into a pressurized reactor. The reaction mixture is heated to 80° C. at a pressure of 500 psi for 5 hours. The resulting gelled polymer is pyrolyzed in flowing air or nitrogen to about 1150° C. at 200° C. per hour to form black glass.

EXAMPLE XXIV 46.09 grams of dihydrocyclosiloxane (mixture of trimer, tetramer, pentamer, hexamer and heptamer) (DHCS), 26.0 grams of acetylene and 0.10 gram of chloroplatinic acid are charged into a pressurized reactor. The reaction mixture is heated to 80° C. at a pressure of 500 psi for 5 hours. The resulting gelled polymer is pyrolyzed in flowing air or nitrogen to about 1150° C. at 200° C. per hour to form black glass.

EXAMPLE XXV

NMR Data of Polymer Precursor

Solid state nuclear magnetic resonance (NMR) $^{13}C$ and $^{29}Si$ spectra of the polymer precursor prepared as Polymer A in Example 1 were obtained. The Polymer A was further post-cured at 100° C. for 3 hours. The polymer mass was ground into powder and packed tightly into a zirconia rotor. The NMR experiments were run at 30° C.

The NMR spectra were acquired with Chemagnetics CMX-300 solid state NMR spectrometer, operating at 75 MHz for $^{13}C$ and 59.5 MHz for $^{29}Si$. The spectra were acquired via cross polarization. 5 μs 90° pulses were applied with 5 KHz magic angle spinning rate. The $^{29}Si$ spectrum was acquired with 10 ms contact times and 5 seconds cycle times while for $^{13}C$ spectrum the contact time was 5 ms and the cycle time was 3 seconds.

The $^{29}Si$ spectrum showed a major peak at −20 ppm which corresponded to the $(CH_3)SiO_2(CH_2CH_2)$ silicon configuration. A lesser peak was found at −36 ppm corresponding to the $(CH_3)SiO_2(CHCH_3)$ configuration. The structures are formed from hydrosilylation between hydrosilane and vinylsilane moieties. There were three other minor peaks with chemical shifts (σ), assignments and intensity percentages listed in the following table. The peak at −11 ppm appears to represent one of the monomers. The peaks at −57 and −67 ppm were not found in the monomers and are considered to represent structures formed by rearrangement reactions occurring during polymerization at elevated temperatures.

| σ, ppm | Assignment | Percentage |
|---|---|---|
| −20 | (CH$_3$)SiO$_2$(CH$_2$CH$_2$) | 76.7 |
| −36 | (CH$_3$)SiO$_2$(CHCH$_3$) | 10.2 |
| −57 | (CH$_3$)SiO$_3$ | 6.4 |
| −67 | (CH$_2$)SiO$_3$ | 4.5 |
| −11 | CH$_3$SiHO$_2$ | 2.2 |

The above results suggest that the silicon atoms are linked by ethylene groups (σ=−20) and to a lesser extent by methylene groups (σ=−36). These correspond to reactions 3 and 4 described earlier and the alternative moieties which have been described and are claimed below.

The $^{13}$C NMR spectrum showed two major peaks which can be assigned to be Si-CH$_3$ and Si-CH$_2$-. The data were summarized as follows:

| σ, ppm | Assignment | Percentage |
|---|---|---|
| 4 | Si—CH$_3$ | 58 |
| 12 | Si—CH$_2$— | 33 |
| 19 | SiCH(CH$_3$)Si | 5 |
| 140 | Si—CH=CH$_2$ | 4 |

The structure of the polymer precursor revealed from the carbon and silicon NMR shows the existence of both methylene (σ=19) and ethylene linkages (σ=12) between silicon atoms as expected from the results of the $^{29}$Si spectrum. The Si-CH$_3$ linkage is considered to be the same linkage found in the two monomers, both of which contained methyl groups attached to silicon atoms.

EXAMPLE XXVI

$^{29}$Si NMR Data of the Silicon Carboxide

The black glass prepared in Example I was analyzed by solid state magic angle spinning nuclear magnetic resonance spectroscopy. The spectrum was acquired at 59.497 MHz on a Chemagnetics CMX300 NMR spectrometer. Data was obtained by single pulse technique without decoupling. Recycle time was 6000 seconds with 400 scans. An external reference of 3-(trimethylsilyl)-1-propanesulfonic acid, sodium salt, was used to calibrate the chemical shift (1.18 ppm). The NMR peaks were deconvoluted using NMRI computer software and a gaussian lineshape function was employed to resolve the peaks. The characters of the deconvoluted peaks were listed as follows:

| σ, ppm | Assignment | Percentage |
|---|---|---|
| −111 | Si—O$_4$ | 27.7 |
| −73 | C—Si—O$_3$ | 16.2 |
| −34 | C$_2$—Si—O$_2$ | 22.6 |
| −12 | C$_4$—Si | 33.5 |

The NMR data demonstrates that the silicon is bonded to different combinations of silicon and oxygen atoms, forming a silicon oxycarbide or silicon carboxide network.

We claim as our invention:

1. A black glass ceramic produced by pyrolyzing at a temperature of 800° C. to 1400° C. a precursor polymer containing the moieties

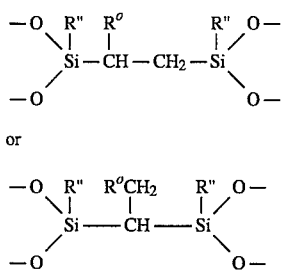

or where

R$^o$ is the unreacted residue of an alkene having 2 to 20 carbon atoms

R' is H, an alkyl group having 1 to 20 carbon atoms, or an alkene having 2 to 20 carbon atoms.

2. A black glass ceramic of claim 1 wherein said moiety is derived from the reaction of cyclosiloxane monomers containing silicon-vinyl bonds and/or silicon-hydride bonds.

3. A black glass ceramic of claim 1 wherein said moiety is derived from the reaction of cyclosiloxane monomers containing silicon-hydride bonds with acetylene.

4. A black glass ceramic of claim 1 wherein said moiety is derived from the reaction of cyclosiloxane monomers containing two hydride bonds attached to a silicon atom with cyclosiloxane monomers containing silicon-vinyl bonds.

* * * * *

UNITED STATES PATENT AND TRADEMARK OFFICE
CERTIFICATE OF CORRECTION

PATENT NO. : 5,455,208

DATED : October 3, 1995

INVENTOR(S) : Roger Y. Leung et al.

It is certified that error appears in the above-identified patent and that said Letters Patent is hereby corrected as shown below:

Column 16, line 35: "$R'$" should read --$R''$--

Signed and Sealed this

Second Day of July, 1996

*Attest:*

BRUCE LEHMAN

*Attesting Officer*  *Commissioner of Patents and Trademarks*